United States Patent [19]
Jacobs et al.

[11] Patent Number: 4,970,243

[45] Date of Patent: Nov. 13, 1990

[54] PROCESS FOR THE PRODUCTION OF FLEXIBLE SLABSTOCK POLYURETHANE FOAMS

[75] Inventors: Gundolf Jacobs, Bergisch Gladbach; Peter Haas, Haan; Hans-Walter Illger, Roesrath-Forsbach; Hans-Joachim Kogelnik, Bergisch Gladbach; Klaus-Dieter Wolf, Cologne, all of Fed. Rep. of Germany

[73] Assignee: Bayer Aktiengesellschaft, Bayerwerk, Fed. Rep. of Germany

[21] Appl. No.: 361,896

[22] Filed: Jun. 6, 1989

[30] Foreign Application Priority Data

Jun. 11, 1988 [DE] Fed. Rep. of Germany ....... 3819940

[51] Int. Cl.$^5$ .............................................. C08G 18/14
[52] U.S. Cl. .................................... 521/155; 521/160; 521/174; 521/176
[58] Field of Search ................ 521/155, 160, 174, 176

[56] References Cited

U.S. PATENT DOCUMENTS 4,916,168 4/1990 Pham et al. ......................... 521/167

FOREIGN PATENT DOCUMENTS 892776 3/1962 United Kingdom .

Primary Examiner—Maurice J. Welsh
Attorney, Agent, or Firm—Joseph C. Gil; Richard E. L. Henderson

[57] ABSTRACT

This invention relates to a process for the production of elastic, open-cell flexible slabstock polyurethane foams comprising reacting at an isocyanate index less than about 80 one or more polyisocyanates selected from the group tolylene diisocyanates, hexamethylene diisocyanate, and isophorone diisocyanate, with compounds containing at least two isocyanate-reactive hydrogen atoms and having a molecular weight of about 400 to about 10,000, in the presence of water as blowing agent in a quantity of about 5 to about 15 parts by weight for every 100 parts by weight of the isocyanate-reactive compound. The process may optionally include chain-extending and crosslinking agents containing at least two isocyanate-reactive hydrogen atoms and having a molecular weight of about 32 to about 399, and may optionally be carried out in the presence of other blowing agents, catalysts, auxiliaries, and additives.

13 Claims, No Drawings

PROCESS FOR THE PRODUCTION OF FLEXIBLE SLABSTOCK POLYURETHANE FOAMS

BACKGROUND OF THE INVENTION

Slabstock polyurethane foams having relatively low gross densities are foamed by carbon dioxide produced in situ during the isocyanate/water reaction or by a combination of carbon dioxide formed in situ and organic blowing agents, such as halogenated hydrocarbons, added to the reaction mixture. Foams having gross densities below about 27 kg/m$^3$ can be produced by the process of the present invention, whereas foams having gross densities below about 21 kg/m$^3$ are generally produced by addition of auxiliary blowing agents. The different procedures are used because the quantity of water otherwise necessary for the lower density foams can often lead to serious discoloration or, in extreme cases, even to spontaneous ignition of the foam slabs caused by the highly exothermic nature of the isocyanate-water reaction. In addition, with certain polyols the use of large quantities of water (for example, 4.5 parts) results in relatively hard and brittle foams instead of the soft and hypersoft materials often required.

All auxiliary blowing agents hitherto used, such as halogenated hydrocarbons, carbon monoxide from the AB process, low-boiling hydrocarbons, and the like, produce serious pollution of, and thus endanger, the workplace and the environment. Despite many attempts, no environmentally safe blowing agent has hitherto been produced.

It has now surprisingly been found, however, that under certain conditions water can act both as a chemical blowing agent (that is, by producing carbon dioxide from the isocyanate-water reaction) and as a physical blowing agent. Consequently, water alone may be used as the blowing agent for producing foams having gross densities below 21 kg/m$^3$. In particular, the process of this invention uses an atypically large quantity of water relative to the "base polyol" (at least 5 parts by weight water per 100 parts polyol) and, at the same time, a hitherto prohibitively low isocyanate index of less than 80.

British Patent No. 892,776 indicates that rigid or semirigid polymer foams can be obtained by reaction of 100 parts by weight of a monomeric organic polyisocyanate with from 1 to 30 parts by weight of water in the presence of a surface-active agent and a catalyst, preferably in the presence of from 5 to 30 parts by weight of a polyfunctional compound containing two or more isocyanate-reactive groups. However, the "catalysts" described in this reference are inorganic materials of the potassium acetate or sodium hydroxide type. Thus, the foaming process follows a course largely determined by trimerization reactions and the principle of maintaining low isocyanate index, as used in the present invention, does not come into effect. In addition, the flexible slabstock polyurethane foams produced in accordance with the present invention differ from the rigid and semirigid foams obtainable according to the British patent, particularly in exhibiting different deformation characteristics. For example, deformations observable during hardness measurements indicate that the flexible slabstock polyurethane foams produced in accordance with the present invention have higher resilience (that is, faster recovery after loading) and a lower hardness level, two advantageous characteristics in view of performance requirements. The value characteristic of the deformation property is relative energy absorption after 70% compression, H 70, as shown in Table 1 below.

SUMMARY OF THE INVENTION

The present invention relates to a process for the production of elastic, open-cell flexible slabstock polyurethane foams comprising reacting at an isocyanate index less than about 80, preferably from about 40 to about 65, (a) one or more polyisocyanates selected from the group consisting of tolylene diisocyanates, hexamethylene diisocyanate, and isophorone diisocyanate,
with
(b) compounds containing at least two isocyanate-reactive hydrogen atoms and having a molecular weight of about 400 to about 10,000,
in the presence of
(c) water as blowing agent in a quantity of about 5 to about 15 parts by weight for every 100 parts by weight of component (b),
and, optionally, with
(d) chain-extending and crosslinking agents containing at least two isocyanate-reactive hydrogen atoms and having a molecular weight of about 32 to about 399,
and, optionally, in the presence of
(e) other blowing agents, catalysts, auxiliaries, and additives.

DETAILED DESCRIPTION OF THE INVENTION

The process of this invention uses at least 5 (preferably about 6 to about 10) parts by weight of water per 100 parts by weight of isocyanate-reactive component (b). At the same time, a hitherto prohibitively low isocyanate index of less than 80 (preferably from about 65 down to about 40) is used instead of the more usual isocyanate range of about 90–120.

Foaming is carried out using normal flexible foam formulations containing polyisocyanates, preferably tolylene diisocyanate containing 80% by weight 2,4-isomer and 20% by weight 2,6-isomer ("TDI 80"). The resultant foams exhibit gross density/compression hardness ratios which, hitherto, could only be obtained by the additional use of auxiliary blowing agents.

The following materials are suitable starting components for the production of the flexible slabstock polyurethane foams according to the process of this invention:

1. Polyisocyanates, including, for example, tolylene diisocyanate isomers, such as 2,4- and 2,6-tolylene diisocyanate and mixtures of these isomers ("TDI"); hexamethylene diisocyanate; and isophorone diisocyanate. Also suitable are carbodiimide-, urethane-, allophanate-, isocyanurate-, urea-, and biuret-modified polyisocyanates derived from 2,4- and 2,6-tolylene diisocyanate, hexamethylene diisocyanate, or isophorone diisocyanate. Mixtures of the above polyisocyanates, including the various isomeric forms thereof, are, of course, also suitable.

Preferred polyisocyanates for use in accordance with the invention include tolylene diisocyanate in the form of an 80:20 mixture of the 2,4- and 2,6-isomers ("TDI 80"), tolylene diisocyanate in the form of a 65:35 mixture of the 2,4- and 2,6-isomers ("TDI 65"), and tolylene diisocyanate prepolymers.

2. Compounds containing at least two isocyanate-reactive hydrogen atoms and having a molecular weight of from about 400 to about 10,000. Suitable compounds contain amino groups, thiol groups, or carboxyl groups, and preferably include compounds containing hydroxyl groups (especially 2 to 8 hydroxyl groups), particularly those having a molecular weight in the range from about 1000 to about 6000 (preferably in the range from 2000 to 6000). Examples of suitable isocyanate-reactive compounds include polyethers, polyesters, polycarbonates, and polyester amides containing at least 2, generally 2 to 8, but preferably 2 to 6, hydroxyl groups, of the type known for the production of homogeneous and cellular polyurethanes and described, for example, in German Offenlegungsschrift 2,832,253, pages 11 to 18. Preferred compounds have an OH value of about 28 to about 56.

3. Optionally, compounds containing at least two isocyanate-reactive hydrogen atoms and having a molecular weight of about 32 to about 399. Suitable compounds contain hydroxyl groups, amino groups, thiol groups, or carboxyl groups, preferably hydroxyl groups and/or amino groups, which serve as crosslinking agents or chain extending agents. These compounds generally contain about 2 to about 8 (preferably 2 to 4) isocyanate-reactive hydrogen atoms. Examples of such compounds can be found in German Offenlegungsschrift 2,832,253, pages 10 to 20.

4. Water as a chemical and physical blowing agent in a quantity of 5 to 15 parts by weight to 100 parts by weight of component (b).

5. Optionally, auxiliaries and additives, such as
 (a) readily volatile organic substances as further blowing agents,
 (b) known reaction accelerators and reaction retarders in the usual quantities,
 (c) surface-active additives, such as emulsifiers and foam stabilizers; known cell regulators, such as paraffins, fatty alcohols, and dimethyl polysiloxanes; pigments or dyes; known flameproofing agents, such as trichloroethyl phosphate and tricresyl phosphate; stabilizers against the effects of aging and weather; plasticizers; fungistatic and bacteriostatic agents; and fillers, such as barium sulfate, kieselguhr, carbon black, and whiting.

These optional auxiliaries and additives are described, for example, in German Offenlegungsschrift No. 2,732,292, pages 21 to 24. Further examples of surface-active additives and foam stabilizers, cell regulators, reaction retarders, stabilizers, flameproofing agents, plasticizers, dyes and fillers, fungistatic and bacteriostatic agents which may optionally be used in accordance with the invention and information on the use and mode of action of these additives can be found in Kunststoff-Handbuch, Vol. VII, published by Vieweg and Höchtlen, Carl-Hanser-Verlag, Munich, 1966, for example on pages 103 to 113.

The process according to the invention is carried out using the known one-shot process, the prepolymer process, or the semiprepolymer process, often using machines such as those described in U.S. Pat. No. 2,764,565. Information on processing machines which may also be used in accordance with the invention can be found in Kunststoff-Handbuch, Vol. VII, published by Vieweg and Höchtlen, Carl-Hanser-Verlag, Munich 1966, for example, on pages 121 to 205.

In the process of this invention, all the components are reacted at an isocyanate index of below 80, preferably in the range of about 40 to 65. The isocyanate index, a term frequently used in describing the production of polyurethane foams, is indicative of the degree of crosslinking of a foam. It is customary to regard a foam made using a stoichiometric or theoretically required quantity of isocyanate as having been made at an isocyanate index of 100. Thus, the index can be helpful in more closely defining the degree of under-crosslinking or over-crosslinking. The index is calculated in accordance with the following general equation:

$$\text{index} = \frac{\text{quantity of isocyanate(actual)}}{\text{quantity of isocyanate(theoretical)}} \times 100.$$

The flexible slabstock polyurethane foams obtainable by the process of this invention generally have gross densities of about 8 to about 27 kg/m$^3$, preferably about 10 to about 20 kg/m$^3$. The foams produced in accordance with the invention can be used, for example, in the manufacture of seating. Such foams are also used, for example, as fillings in cushions and quilts.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Flexible foam slabs were produced in a continuous high-pressure machine (of the type made by Hennecke, Birlinghoven, Siegkreis, Federal Republic of Germany) using the following starting materials:

Polyethers used:
Polyether A: trifunctional long-chain propylene-oxide/ethylene-oxide ("PO/EO") polyether (approx. 70% EO; OH value 36)
Polyether B: trifunctional PO/EO polyether (approx. 14% EO; OH value 35)
Polyether C: trifunctional long-chain PO/EO polyether mixed with a hexafunctional short-chain crosslinking agent (total approx. 17% EO; OH value 67)
Polyether D: difunctional and trifunctional long-chain PO/EO polyether (approx. 10% EO; OH value 46)

Catalysts and stabilizers used:
Catalyst 1: triethylenediamine (33% in dipropylene glycol)
Catalyst 2: tin(II) octoate
Catalyst 3: Desmorapid PS 207 (Bayer AG)
Stabilizer 1: Tegostab BF 2270 (Goldschmidt AG)
Stabilizer 2: Tegostab B 3136 (Goldschmidt AG)

Isocyanates used:
TDI 80: a tolylene diisocyanate mixture of 2,4- and 2,6-tolylene diisocyanate in a ratio by weight of 80:20
TDI 65: a tolylene diisocyanate mixture of 2,4- and 2,6-tolylene diisocyanate in a ratio by weight of 65:35

The foaming formulations, as well as the test data, for the resultant foams are shown in Table 1. Quantities are given in parts by weight.

TABLE 1

| | Example | | | |
|---|---|---|---|---|
| | 1 | 2 | 3 | 4 |
| Polyether A | 75 | 75 | — | — |
| Polyether B | — | — | 100 | — |

TABLE 1-continued

|  | Example | | | |
|---|---|---|---|---|
|  | 1 | 2 | 3 | 4 |
| Polyether C | — | — | — | 100 |
| Polyether D | 25 | 25 | — | — |
| Catalyst 1 | 0.5 | — | — | — |
| Catalyst 2 | — | 0.5 | 0.2 | 0.26 |
| Catalyst 3 | — | — | 0.12 | 0.14 |
| Stabilizer 1 | 1.2 | 1.2 | — | — |
| Stabilizer 2 | — | — | 1.2 | 1.6 |
| Water | 7.0 | 10.0 | 9.0 | 6.0 |
| TDI 80 | 41.2 | 53.5 | 47.0 | 41.6 |
| TDI 65 | — | — | 11.8 | 10.4 |
| Isocyanate index | 54 | 50 | 65 | 72 |
| Gross density (kg/m$^3$) | 16 | 15 | 16 | 20 |
| Compression hardness (kPa) | 0.4 | 0.9 | 1.9 | 2.2 |
| H 70 (%) | 42 | 43 | 41 | 46 |

What is claimed is:

1. A process for the production of an elastic, open-cell flexible slabstock polyurethane foam comprising reacting at an isocyanate index less than about 80,
   (a) one or more polyisocyanates selected from the group consisting of tolylene diisocyanates, hexamethylene diisocyanate, and isophorone diisocyanate, with
   (b) a compound containing at least two isocyanate-reactive hydrogen atoms and having a molecular weight of about 400 to about 10,000, in the presence of
   (c) water as blowing agent in a quantity of about 5 to about 15 parts by weight for every 100 parts by weight of component (b).

2. A process according to claim 1 wherein the isocyanate index is from about 40 to about 65.

3. A process according to claim 1 wherein the polyurethane foam has a gross density of about 8 to about 27 kg/m$^3$.

4. A process according to claim 1 wherein the polyurethane foam has a gross density of about 10 to about 20 kg/m$^3$.

5. A process according to claim 1 wherein component (a) is one or more tolylene diisocyanates.

6. A process according to claim 5 wherein component (a) is a mixture of 2,4-tolylene diisocyanate and 2,6-tolylene diisocyanate.

7. A process according to claim 1 wherein component (b) is a polyether containing from 2 to 6 hydroxyl groups.

8. A process according to claim 7 wherein the polyether contains 2 or 3 hydroxyl groups.

9. A process according to claim 1 for the production of an elastic, open-cell flexible slabstock polyurethane foam having a gross density of about 10 to about 20 kg/m$^3$ comprising reacting at an isocyanate index of from about 40 to about 65,
   (a) a mixture of 2,4-tolylene diisocyanate and 2,6-tolylene diisocyanate, with
   (b) a polyether containing from 2 to 6 hydroxyl groups, in the presence of
   (c) water as blowing agent in a quantity of about 5 to about 15 parts by weight for every 100 parts by weight of component (b).

10. A process according to claim 1 additionally containing
    (d) a chain-extending or crosslinking agent containing at least two isocyanate-reactive hydrogen atoms and having a molecular weight of about 32 to about 399.

11. A process according to claim 9 additionally containing
    (d) a chain-extending or crosslinking agent containing at least two isocyanate-reactive hydrogen atoms and having a molecular weight of about 32 to about 399.

12. A process according to claim 1 additionally carried out in the presence of other blowing agents, catalysts, auxiliaries, and additives.

13. A process according to claim 9 additionally carried out in the presence of other blowing agents, catalysts, auxiliaries, and additives.

* * * * *

REEXAMINATION CERTIFICATE (1597th)
United States Patent [19]
Jacobs et al.

[11] B1 4,970,243
[45] Certificate Issued Nov. 26, 1991

[54] PROCESS FOR THE PRODUCTION OF FLEXIBLE SLABSTOCK POLYURETHANE FOAMS

[75] Inventors: Gundolf Jacobs, Bergisch Gladbach; Peter Haas, Haan; Hans-Walter Illger, Roesrath-Forsbach; Hans-Joachim Kogelnik, Bergisch Gladbach; Klaus-Dieter Wolf, Cologne, all of Fed. Rep. of Germany

[73] Assignee: Bayer Aktiengesellschaft, Leverkusen, Fed. Rep. of Germany

Reexamination Request:
No. 90/002,279, Feb. 8, 1991

Reexamination Certificate for:
Patent No.: 4,970,243
Issued: Nov. 13, 1990
Appl. No.: 361,896
Filed: Jun. 6, 1989

[30] Foreign Application Priority Data

Jun. 11, 1988 [DE] Fed. Rep. of Germany ....... 3819940

[51] Int. Cl.$^5$ .............................................. C08G 18/14
[52] U.S. Cl. .................................. 521/155; 521/160; 521/174; 521/176

[56] References Cited

U.S. PATENT DOCUMENTS

| | | | |
|---|---|---|---|
| 3,706,678 | 12/1972 | Dietrich et al. | 260/2.5 AD |
| 4,833,176 | 5/1989 | Wolf et al. | 521/160 |
| 4,916,168 | 4/1990 | Pham et al. | 521/167 |

FOREIGN PATENT DOCUMENTS

| | | |
|---|---|---|
| 2948289 | 4/1981 | Fed. Rep. of Germany . |
| 892776 | 3/1962 | United Kingdom . |

OTHER PUBLICATIONS

Journal of Cellular Plastics, Band 20, No. 3, May/Jun. 1984.

*Primary Examiner*—Maurice J. Welsh

[57] ABSTRACT

This invention relates to a process for the production of elastic, open-cell flexible slabstock polyurethane foams comprising reacting at an isocyanate index less than about 80 one or more polyisocyanates selected from the group tolylene diisocyanates, hexamethylene diisocyanate, and isophorone diisocyanate, with compounds containing at least two isocyanate-reactive hydrogen atoms and having a molecular weight of about 400 to about 10,000, in the presence of water as blowing agent in a quantity of about 5 to about 15 parts by weight for every 100 parts by weight of the isocyanate-reactive compound. The process may optionally include chain-extending and crosslinking agents containing at least two isocyanate-reactive hydrogen atoms and having a molecular weight of about 32 to about 399, and may optionally be carried out in the presence of other blowing agents, catalysts, auxiliaries, and additives.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-13 is confirmed.

* * * * *